(12) United States Patent
Wilkey (10) Patent No.: US 9,451,814 B2
(45) Date of Patent: Sep. 27, 2016

(54) SNAP-COUPLING ELECTRONICS CASE (71) Applicant: CASE-MATE, INC., Tucker, GA (US)

(72) Inventor: Robert D. Wilkey, Atlanta, GA (US)

(73) Assignee: CASE-MATE, INC., Tucker, GA (US)

(*) Notice: Subject to any disclaimer, the term of this patent is extended or adjusted under 35 U.S.C. 154(b) by 102 days.

(21) Appl. No.: 14/064,845

(22) Filed: Oct. 28, 2013

(65) Prior Publication Data
US 2014/0116897 A1 May 1, 2014

Related U.S. Application Data (60) Provisional application No. 61/720,028, filed on Oct. 30, 2012.

(51) Int. Cl.
B65D 85/00 (2006.01)
A45C 11/00 (2006.01)
H04B 1/3888 (2015.01)

(52) U.S. Cl.
CPC ............. *A45C 11/00* (2013.01); *H04B 1/3888* (2013.01); *A45C 2011/002* (2013.01)

(58) Field of Classification Search
CPC ............ B65D 81/02; A45C 2011/002; A45C 2011/003
USPC .......................................................... 206/37
See application file for complete search history.

(56) References Cited

U.S. PATENT DOCUMENTS

| | | | |
|---|---|---|---|
| 5,990,874 A | 11/1999 | Tsumura et al. | |
| 6,415,138 B2 | 7/2002 | Sirola et al. | |
| 6,471,056 B1 | 10/2002 | Tzeng | |
| 6,659,274 B2 | 12/2003 | Enners | |
| 7,180,735 B2 | 2/2007 | Thomas et al. | |
| 7,290,654 B2 | 11/2007 | Hodges | |
| 7,495,895 B2 | 2/2009 | Carnevali | |
| 7,805,172 B2 | 9/2010 | Joo | |
| 7,907,394 B2 | 3/2011 | Richardson et al. | |
| 7,933,122 B2 | 4/2011 | Richardson et al. | |
| 2010/0048267 A1 | 2/2010 | Lin | |
| 2010/0315348 A1 | 12/2010 | Jellicoe et al. | |
| 2012/0321294 A1* | 12/2012 | Tages et al. | 396/535 |
| 2012/0327565 A1* | 12/2012 | Tages et al. | 361/679.01 |
| 2013/0252679 A1* | 9/2013 | Yang et al. | 455/575.8 |
| 2013/0292378 A1* | 11/2013 | Tages | 220/4.02 |
| 2014/0116895 A1* | 5/2014 | Ellenburg et al. | 206/37 |
| 2015/0014188 A1* | 1/2015 | Pyo et al. | 206/37 |

* cited by examiner

*Primary Examiner* — Anthony Stashick
*Assistant Examiner* — James Way
(74) *Attorney, Agent, or Firm* — Gardner Groff Greenwald & Villanueva, PC (57) ABSTRACT A two-piece case for a smart phone or other electronic device includes a base and a frame. Interengaging snap coupling elements on the base and the frame releasably attach the components together to hold a phone within the case.

17 Claims, 8 Drawing Sheets

FIG. 8 ously the first direction.

SNAP-COUPLING ELECTRONICS CASE

CROSS-REFERENCE TO RELATED APPLICATION

This application claims priority benefit to U.S. Provisional Patent Application Ser. No. 61/720,028 filed Oct. 30, 2012, the entirety of which is hereby incorporated herein by reference.

TECHNICAL FIELD

The present invention relates generally to the field of protective and/or decorative cases for smart phones or other electronic devices, and more particularly to a multi-part case having a frame and a base panel that attach together by snap couplings to retain an electronic device therein.

BACKGROUND

Protective and/or decorative cases are used in connection with electronic devices such as tablet computers, smart phones, cell phones, MP3 players and other portable music and/or video players, electronic readers, handheld game devices, and the like. Various means of mounting the case on the electronic device are known, but continued improvements are sought. It is to the provision of an improved case for electronic devices that the present invention is primarily directed.

SUMMARY

In example embodiments, the present invention provides an improved case for electronic devices, the case having a back panel and a peripheral frame. Snap coupling elements and interengagement features are formed on the back panel and the peripheral frame to attach the two components together and retain a smart phone or other electronic device within the case.

In one aspect, the present invention relates to a case for an electronic device. The case includes a base having a back panel and at least one attachment flange having at least one first snap coupling element thereon. The case also includes a frame including a top, a bottom and first and second sidewalls, an open front and an open back, and a lip projecting inwardly around at least a portion of the open front. The frame also includes at least one second snap coupling element for releasable engagement with the at least one first snap coupling element to attach the base to the frame and retain an electronic device therein.

In another aspect, the present invention relates to a case for an electronic device including a base and a frame. The base includes a back panel and at least one attachment flange. The attachment flange includes at least one first snap coupling element and at least one first interengagement feature. The frame includes a top, a bottom, and first and second sidewalls, with an open front and back. A lip projects inwardly around at least a portion of the open front. The frame also includes at least one second snap coupling element and at least one second interengagement feature. The at least one first snap coupling element is configured for releasable engagement with the at least one second snap coupling element to attach the base to the frame and retain the electronic device therein wherein the first and second snap coupling elements restrict movement therebetween in a first direction. The at least one first interengagement feature is configured for releasable interengagement with the at least one second interengagement feature to restrict movement therebetween in a second direction that is generally transverse to the first direction.

In one example form, the at least one first snap coupling element includes a male rib and the at least one second snap coupling element includes a female channel configured to receive the male rib. Optionally, the at least one first snap coupling element includes a gradual reduction or tapered portion for assisting in assembly or disassembly of the case. Optionally, one or more slots are formed along the interface between the frame and the base to facilitate disassembly of the case and removal or replacement of the electronics device. Optionally, one or more of the top, bottom and/or first and second sidewalls define one or more cutout portions for allowing access to or use of controls, ports or other features of the electronic device. Optionally, one or more buttons can be included for operating within the openings to allow for operation of the controls, ports, or other features of the electronic device while at least partially housing or covering the same. Optionally, the back panel of the base includes one or more cutouts for alignment with a camera, flash unit, controls, and/or other features of the electronics device. Optionally, a resilient internal liner can be secured to the back panel of the base.

In yet another aspect, the present invention relates to a case for an electronic device including a base and a frame. The base includes a back panel and at least one attachment flange. The attachment flange includes at least one first snap coupling element and at least one first interengagement feature. The frame includes a top, a bottom, and first and second sidewalls, with an open front and back. The frame also includes a lip projecting inwardly around at least a portion of the open front. The frame further includes at least one second snap coupling element and at least one second interengagement feature. The at least one first snap coupling element is configured for releasable engagement with the at least one second snap coupling element to attach the base to the frame and to retain an electronic device therein. The at least one first and second snap coupling elements restrict movement between the base and the frame in a first direction. The at least one first interengagement feature is configured for releasable interengagement with the at least one second interengagement feature. The at least one first interengagement feature is provided on the at least one attachment flange and the at least one second interengagement feature is provided on at least one of the first and second sidewalls. The releasable interengagement between the first and second interengagement feature restricts movement of at least one of the first and second sidewalls in a second direction, the second direction generally transverse to the first direction.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-8 show various aspects of example embodiments of a case 10 for housing an electronic device D. The case 10 generally comprises a back or base panel 20 and a peripheral sidewall or frame 60. In example forms, the base panel 20 and frame 60 are constructed of polycarbonate or other hard plastic, metal, composite, polymeric, ceramic and/or other material(s) of construction.

In the depicted embodiment, the base or back panel component 20 comprises a generally rectangular planar back 22 with rounded corners, configured to generally match the external geometry of a specified model of smart phone. In alternate embodiments, the shape and size of the case are configured to generally match the external geometry of other electronics devices, such as for example, tablet computers, smart phones, cell phones, MP3 players and other portable music and/or video players, electronic readers, handheld game devices, and the like. The back wall 22 optionally includes one or more openings or cutouts 24 for alignment with a camera, flash unit, controls, and/or other features of the electronics device to which the case 10 is configured for use.

Figure 1:
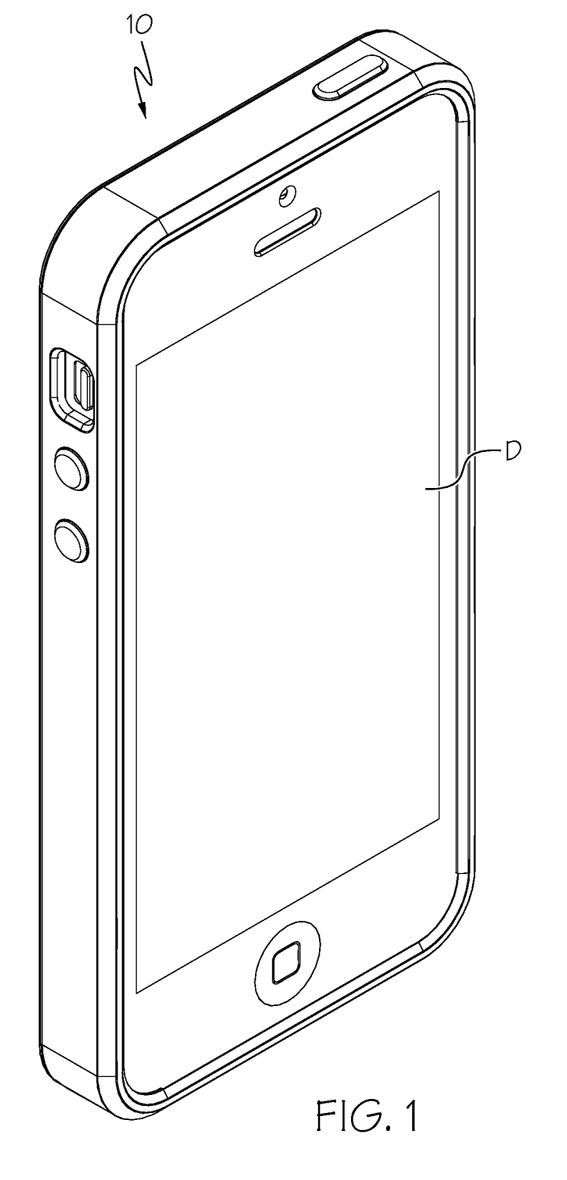
FIG. 1 is a front perspective view of an electronics case according to an example embodiment of the present invention, and showing an electronics device housed therein.
Figure 2:
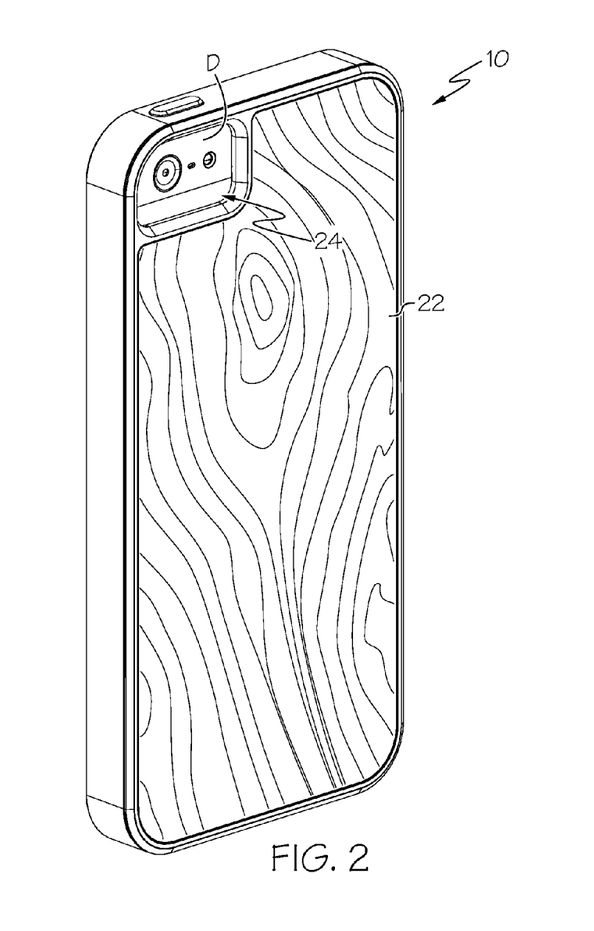
FIG. 2 is a rear perspective view of the electronics case of FIG. 1.
Figure 3:
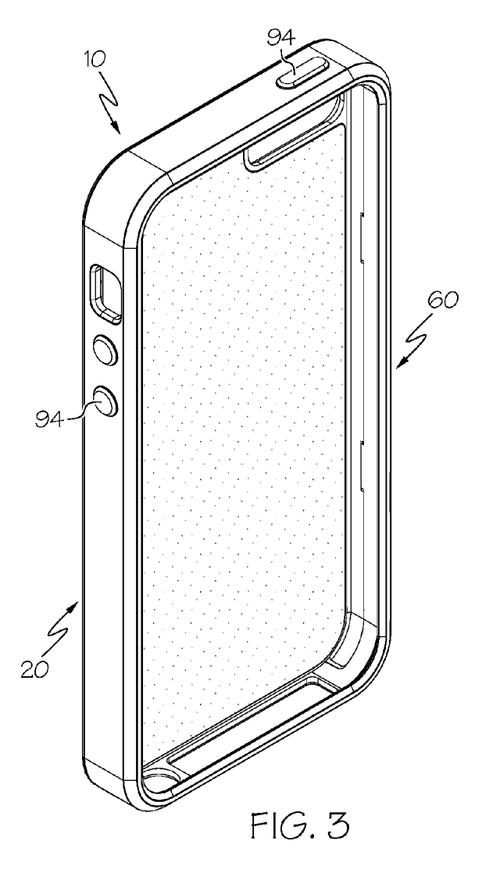
FIG. 3 is a front perspective view of the electronics case of FIG. 1, and wherein the electronics device is removed therefrom to show otherwise hidden portions thereof.

As seen best in FIG. 2, the exterior face of the back 22 of the base panel 20 optionally has one or more decorative or protective materials applied thereto. In the depicted embodiment, the exterior face of the back 22 of the base panel 20 defines a recess into which a natural or simulated wood section is mounted in an ornamental design. In alternate embodiments, one or more sections of other materials such as other natural or simulated wood(s), stone(s), leather(s), metal(s) and/or other materials are applied to the exterior face of the back 22 of the base panel 20 in various combinations, colors, and/or designs.

Figure 4:
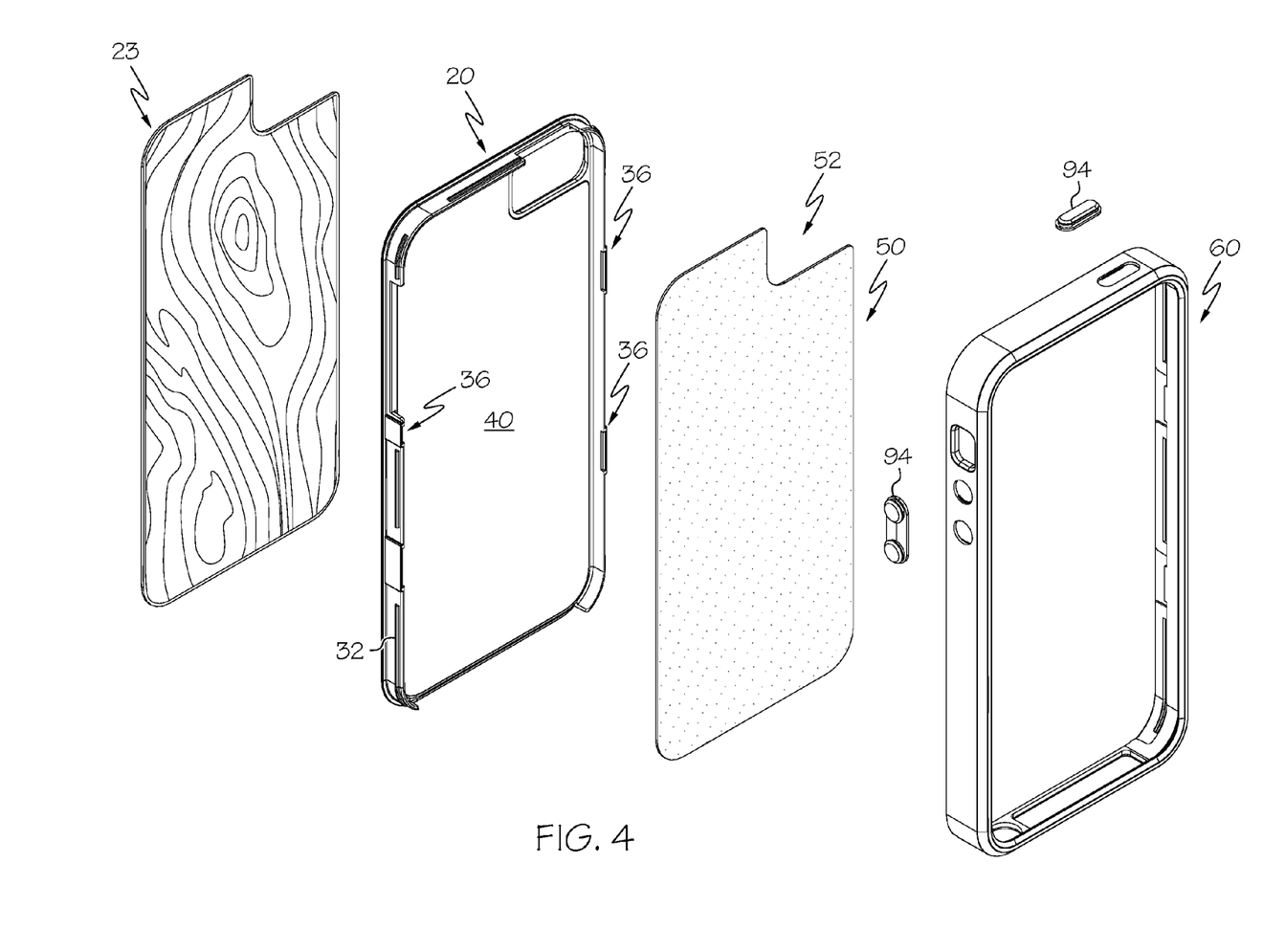
FIG. 4 is a perspective assembly view of the electronics case of FIG. 3.
Figures 5, 5A, 5B:
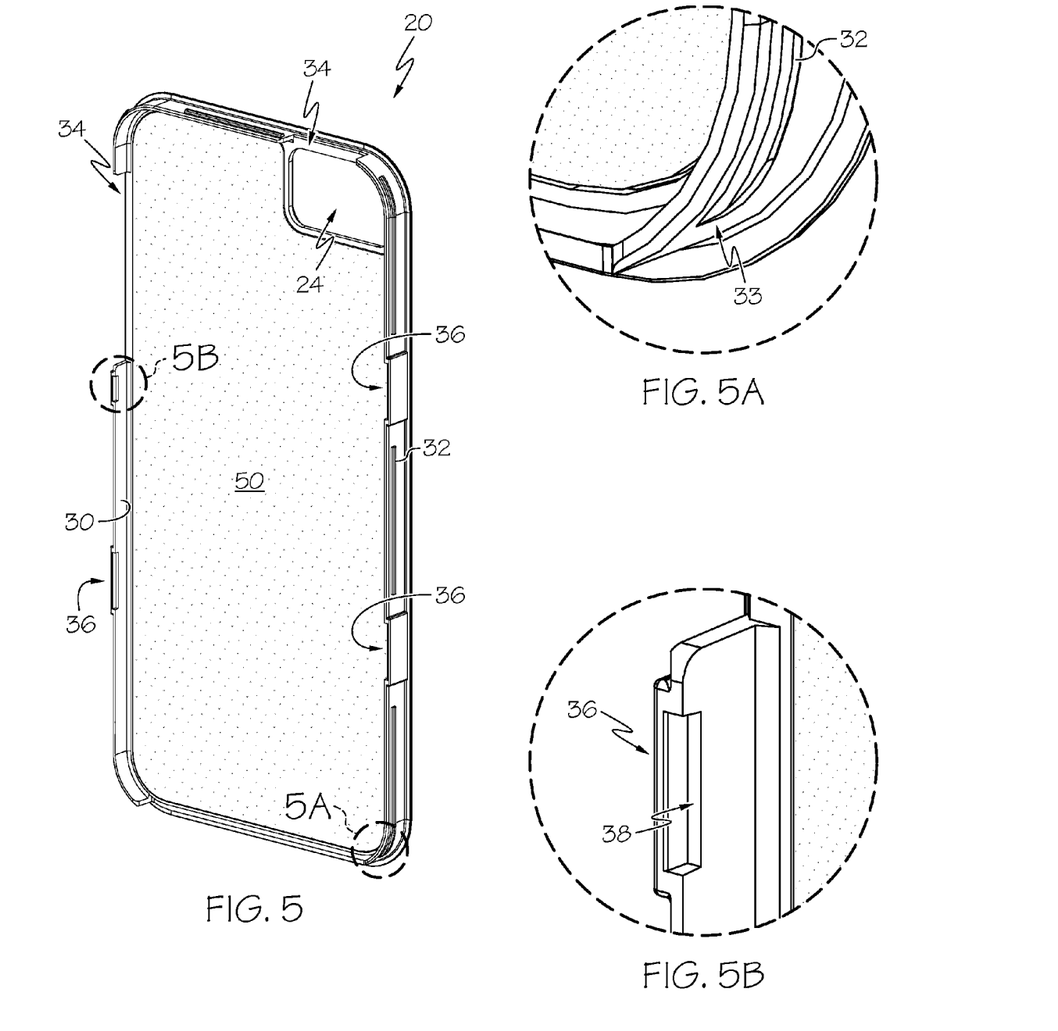
FIG. 5 is a perspective view of the back panel component of the electronics case of FIG. 4.
FIG. 5A is a detailed view of a portion of a snap engagement feature of the back panel component of the electronics case of FIG. 5.
FIG. 5B is a detailed view of a first interengagement feature of the back panel component of the electronics case of FIG. 5.

As seen best in FIGS. 4-5, one or more upright attachment flanges 30 extend generally transversely from the interior face of the back 22 of the base panel 20, about the periphery of the base panel. The attachment flanges 30 include one or more male snap coupling elements 32 at positions along their outer surfaces, for interengagement with cooperating female snap coupling elements on the frame 60, as described below. The attachment flanges 30 optionally also define one or more opening(s) or cutout section(s) 34 for allowing access to controls, ports or other features of the electronic device D. In the depicted embodiment, the male snap coupling elements 32 comprise elongate linear ribs extending lengthwise along the outer surfaces of the attachment flanges 30, generally parallel to the plane of the back 22 of the base panel. Preferably, as shown in FIG. 5A, a portion of the male snap coupling elements 32 comprises a gradual reduction 33 wherein the rib extending along the outer surface of the flange 30 tapers into the flange 30 as the rib approaches the radiused portion of the flange 30, for example toward the bottom of the base panel. Preferably, the male snap coupling element 32 of the flange 30 generally opposite the rib having the gradual reduction 33 comprises a similar taper-like reduction. In example forms, the gradual reduction 33 of the male snap coupling elements 32 assists in assembly and disassembly of the case 10, allowing for easier connection and release of the case components.

In one example embodiment, the flanges 30 further comprise at least one first interengagement feature 36 for releasably interengaging at least one second interengagement feature 74 of the frame 60, as described below. In the depicted embodiment, the at least one interengagement feature 36 is formed with the flange 30 and comprises a channel or slot 38, defining a recessed or laterally offset fin or flange-like portion generally opposite the connected side of the flange 30. In one example form, four first interengagement features are provided along portions of the flanges 30 at spaced apart locations, for example wherein two features are positioned on each flange 30 that extends along the long sides of the case.

The interior face of the back 22 of the base panel 20 optionally defines a shallow recess 40 into which an internal liner 50 is mounted. The liner 50 optionally includes one or more openings or cutout sections 52 for alignment with a corresponding feature of the base panel 20, for example to provide clearance for access to or operation of a camera, control, port or other feature of the electronic device D. The liner 50 can comprise, for example, a sheet of PVC, silicone, rubber, soft plastic, foam, or other resilient material held in place on the base panel 20 by adhesive, to provide a measure of impact resistance.

Figures 6, 6A:
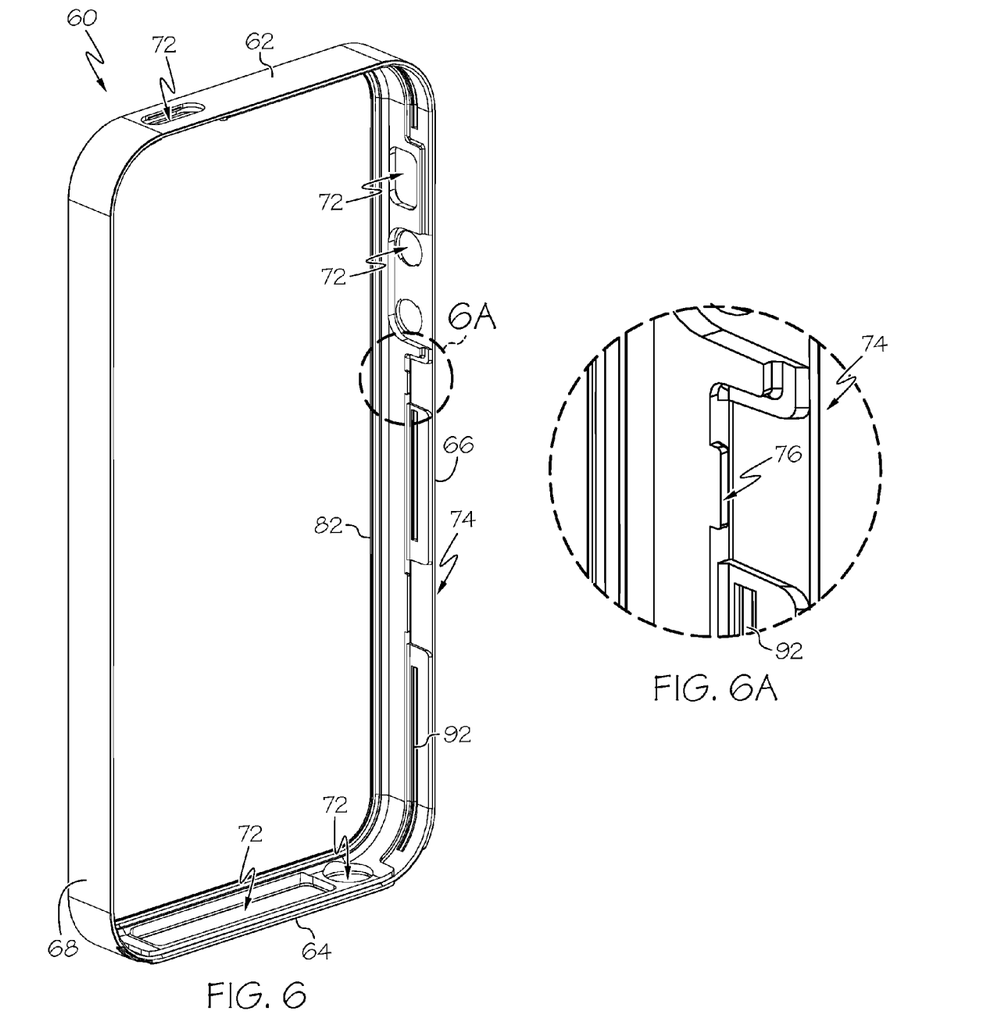
FIG. 6 is a perspective view of the frame component of the electronics case of FIG. 4.
FIG. 6A is a detailed view of a second interengagement feature of the frame of the electronics case of FIG. 6.

As seen best in FIGS. 4 and 6, the peripheral sidewall or frame 60 comprises a generally rectangular body having a top panel 62, a bottom panel 64, and first and second side panels 66, 68, bounding front and back openings. One or more of the top, bottom and/or side panel(s) optionally define one or more openings or cutout portions 72 for allowing access to or use of controls, ports or other features of the electronic device D. Optionally, one or more buttons or actuator inserts 94 can be provided within the openings for interfacing with and operation of the controls, ports, or other features of the electronic device while at least partially housing or covering the same. In one example form, the inserts 94 releasably couple to the openings and permit at least some movement thereof while remaining releasably coupled thereto.

The frame 60 includes a front lip 82 projecting transversely inward into the front opening from the front peripheral edges of the top, bottom and side panels, such that the front opening does not permit the electronic device D to pass through when the case is installed on the device, and to provide protection to the front face of the electronic device.

The internal surfaces of one or more of the top panel 62, the bottom panel 64, and the first and second side panels 66, 68 of the frame 60 define one or more female snap coupling elements 92 for cooperative releasable engagement with the male snap coupling elements 32 of the base panel 20 when the case 10 is assembled. In the depicted embodiment, the female snap coupling elements 92 comprise elongate linear channels extending along the internal surfaces of the walls of the frame, generally parallel to the plane defined by the front lip 82. In alternate embodiments, the configuration and/or orientation of the male snap coupling elements 32 and the female snap coupling elements 92 may take other forms, such as pins and holes, projections and recesses, or other interengaging or abutting surface features; and/or the position of the male and female snap coupling elements can be reversed, with the male elements being on the frame 60 and the female elements being on the base 20.

Figure 7:
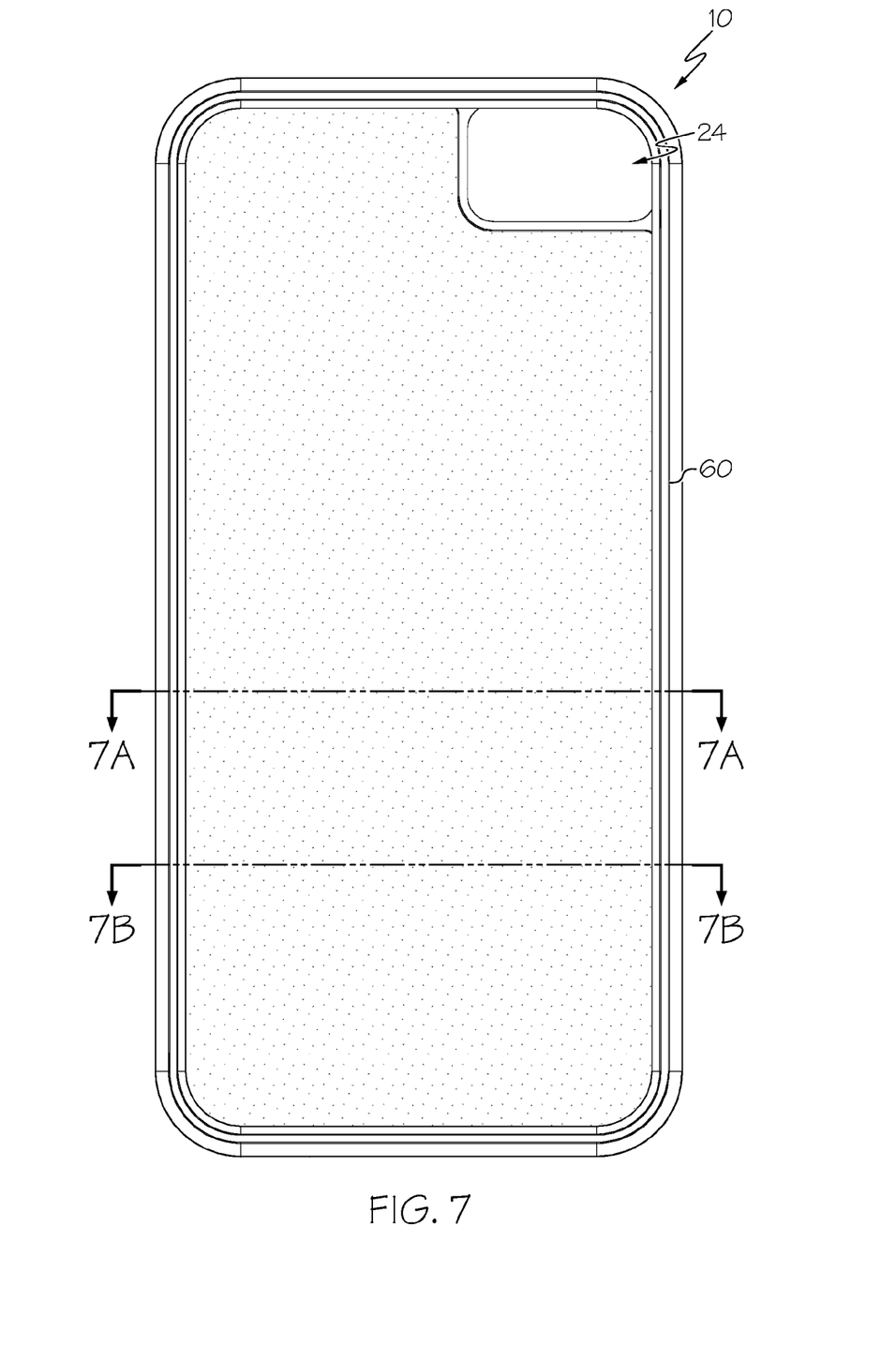
FIG. 7 is a front view of the electronics case of FIG. 3.
Figure 7A:
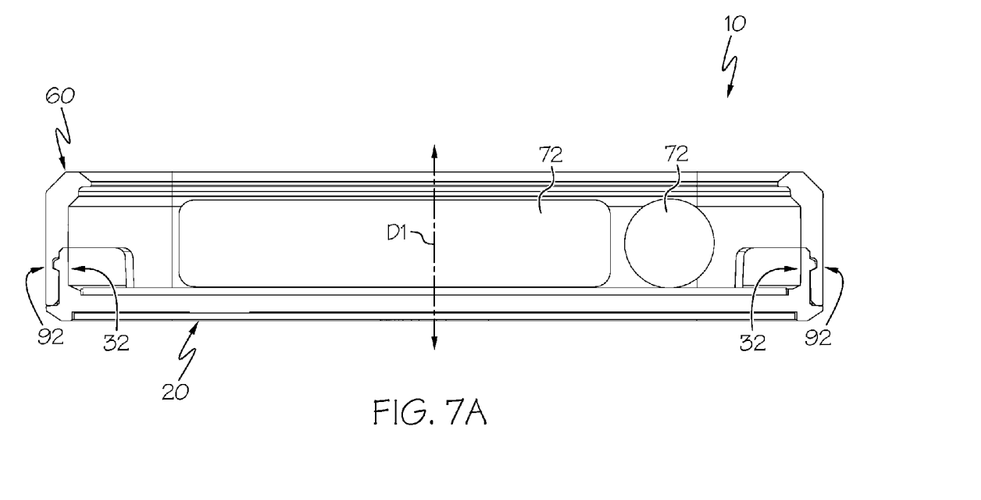
FIG. 7A is a cross-sectional view of the electronics case of FIG. 7 taken along line 7A-7A.
Figure 7B:
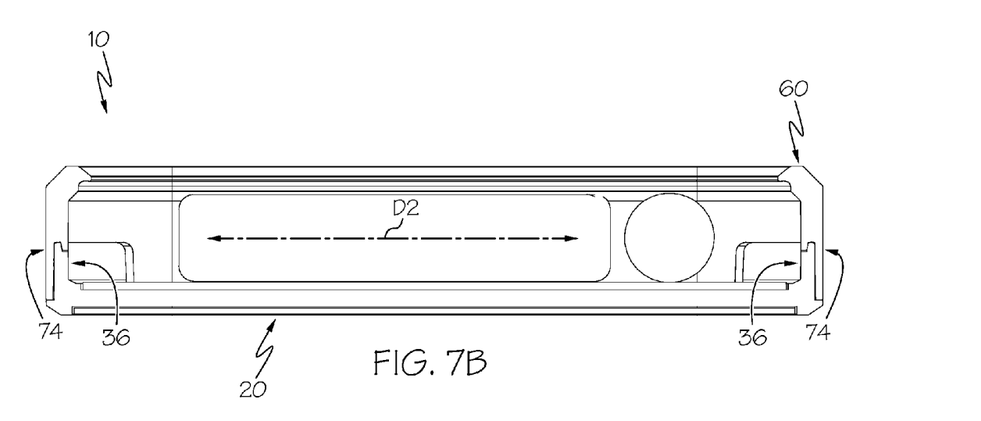
FIG. 7B is a cross sectional view of the electronics case of FIG. 7 taken along line 7B-7B.

In one example embodiment, at least one of the panels of the frame 60 further comprises at least one second interengagement feature 74 for releasably interengaging the at least one first interengagement feature 36 of the base 20. In the depicted embodiment, four second interengagement features 74 are provided along the panels of the frame 60, for example the first and second side panels 66, 68, for releasably interengaging the four first interengagement features 36 of the base 20 (see FIGS. 3 and 8). The second interengagement feature 74 generally comprises a fin or flange 76 that defines a channel-like slot, generally formed between the internal surface of the side panels 66, 68 and the flange 76. Thus, when the case 10 is assembled, the one or more male snap coupling elements 32 of the base 20 are releasably engaged with the female snap coupling elements 92 of the frame 60 and the at least one first interengagement feature 36 of the base 20 is releasably interengaged with the at least one second interengagement feature 74 of the frame 60. FIGS. 7-7B show greater details of the engagement of the snap coupling elements 32, 92 and interengagement features 36, 74. Taken along line 7A-7A of FIG. 7 and as shown in FIG. 7A, the snap coupling elements 32, 92 releasably couple together to restrain movement between the base 20 and the frame 60 in a first direction D1. And taken along line 7B-7B and as shown in FIG. 7B, the first and second interengagement features 36, 74 releasably interengage to restrain movement between the side panels 66, 68 and the base 20 in a second direction D2, which is generally transverse to the first direction D1. As depicted, the fin 76 of the second interengagement feature 74 is received within the slot 38 of the first interengagement feature 36 and the flange-like portion of the first interengagement feature 36 is received in the channel-like slot (formed between the internal surface of the side panels 66, 68 and the fin 76) of the second interangegement feature 74. Preferably, the first and second interengagement features 36, 74 act to stiffen the panels 66, 68, for example to act against the panels 66, 68 bowing inwards or outwards in the second direction D2. Thus, when the snap coupling elements 32, 92 and the first and second interengagement features 36, 74 releasably engage, the frame 60 acts as if it is more or less integral with the base 20, providing a strong and durable yet releasable connection therebetween. In alternate embodiments, the configuration and/or orientation of the first interengagement features 36 and the second interengagement features 74 may take other forms, such as pins and holes, projections and recesses, or other interengaging or abutting surface features; and/or the position of the first and second interengagement features can be reversed, with the first interengagement features being on the frame 60 and the second interengagement features being on the base 20.

Figure 8:
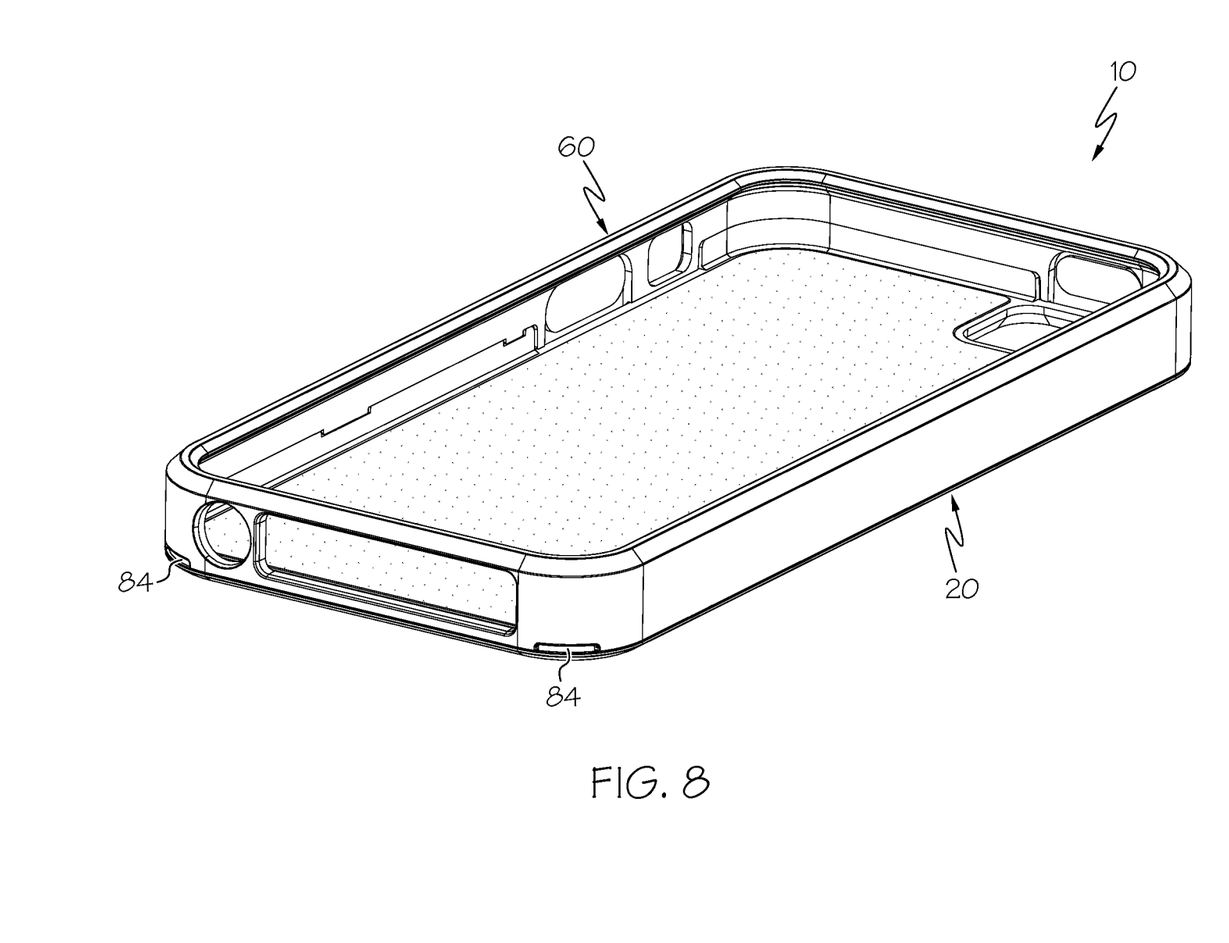
FIG. 8 is a perspective view of the electronics case of FIG. 3, showing the bottom end of the case wherein release access slots are formed along the interface between the base and the frame.

As best seen in FIG. 8, one or more release access recesses or slots 84 are optionally provided along the interface between the frame 60 and the base 20 when assembled, to facilitate disassembly of the case 10 and removal or replacement of the electronic device D. In one example form, the slots 84 are generally positioned near the gradual reduction 33 of the male snap coupling elements 32 to provide for easier releasable disengagement of the base 20 from the frame 60, for example by a user inserting a fingernail or a tool into the slot and prying or pulling the frame apart from the base.

Thus configured, the case 10 of the present invention provides for secure attachment of a smart phone or other electronic device D therein, for example by placement of the phone into the frame 60 with the phone's screen side toward the front lip 82 of the frame, and the phone's controls aligned with the frame's cutouts 72. The base 20 is then installed over the back of the phone, and the attachment flanges 30 of the base inserted into the frame 60 internal of the top panel 62, the bottom panel 64, and the first and second side panels 66, 68 of the frame. The base 20 is pressed into the frame 60 until the male snap coupling elements 32 snap into the female snap coupling elements 92 and the at least one first interengagement feature 36 interengages the at least one second interengagement feature 74, to secure the case 10 in its assembled configuration, with the phone captured and retained between the base and the frame. The phone may then be utilized in standard fashion. To remove the case 10, the user inserts a fingernail or tool into the recess 84 between the base 20 and the frame 60 and separates the parts, allowing the phone to be removed from the case.

While the invention has been described with reference to preferred and example embodiments, it will be understood by those skilled in the art that a variety of modifications, additions and deletions are within the scope of the invention, as defined by the following claims.

What is claimed is:

1. A case for an electronic device comprising:
   a base comprising a back panel and at least one attachment flange which extends from the back panel in a first direction generally perpendicular to the back panel, the attachment flange comprising at least one first snap coupling element and at least one first interengagement feature, the first interengagement feature comprising a channel or slot defining a laterally offset flange-like portion; and
   a frame comprising a top, a bottom, and first and second sidewalls, with an open front and an open back, and a lip projecting inwardly around at least a portion of the open front, the frame further comprising at least one second snap coupling element and at least one second interengagement feature, the second interengagement feature comprising a fin defining a channel-like slot formed between a portion of the sidewalls and the fin,
   wherein the frame couples to the base by sliding the attachment flange of the base into the frame through the open back of the frame in the first direction, and wherein the at least one first snap coupling element is configured for releasable engagement with the at least one second snap coupling element to attach the base to the frame and retain an electronic device therein, whereby engagement of the at least one first and second snap coupling elements resists detachment of the frame from the base, and wherein the at least one first interengagement feature is configured for releasable interengagement in the first direction with the at least one second interengagement feature whereby the fin of the second interengagement feature is received within the slot of the first interengagement feature and the flange-like portion of the first interengagement feature is received in the channel-like slot of the second interengagement feature to resist outward bowing of the first and second sidewalls of the frame in a second direction generally transverse to the first direction and thereby maintain engagement of the first and second snap coupling elements.

2. The case of claim 1, wherein the first snap coupling element comprises a male rib, and the second snap coupling element comprises a female channel configured to receive the male rib.

3. The case of claim 1, wherein the at least one first snap coupling element comprises a gradual reduction or tapered portion for assisting in assembly or disassembly of the case.

4. The case of claim 1, further comprising one or more release access recesses provided along an interface defined between the base and the fame, and wherein the gradual reduction of the first snap coupling element is positioned proximal the one or more release access recesses.

5. The case of claim 1, further comprising one or more slots formed along the interface between the frame and the base to facilitate disassembly of the case and removal or replacement of the electronic device.

6. The case of claim 1, wherein one or more of the top, bottom and/or first and second sidewalls define one or more cutout portions for allowing access to or use of controls, ports or other features of the electronic device.

7. The case of claim 6, further comprising one or more buttons for operating within the cutout portions to allow for operation of the controls, ports, or other features of the electronic device while at least partially housing or covering the same.

8. The case of claim 1, wherein the back panel of the base includes one or more cutouts alignment with a camera, flash unit, controls, and/or other features of the electronics device.

9. The case of claim 1, further comprising a resilient internal liner secured to the back panel.

10. A case for an electronic device comprising:
    a base comprising a back panel and at least one attachment flange which extends from the back panel in a first direction generally perpendicular to the back panel, the attachment flange comprising at least one first snap coupling element and at least one first interengagement feature, the first interengagement feature comprising a channel or slot defining a laterally offset flange-like portion; and
    a frame comprising a top, a bottom, and first and second sidewalls, with an open front and an open back, and a lip projecting inwardly around at least a portion of the open front, the frame further comprising at least one second snap coupling element and at least one second interengagement feature, the second interengagement feature comprising a fin defining a channel-like slot formed between a portion of the sidewalls and the fin,
    wherein the frame couples to the base by sliding the attachment flange of the base into the frame in the first direction, and wherein the at least one first snap coupling element is configured for releasable engagement with the at least one second snap coupling element to attach the base to the frame to resist detachment of the frame from the base, and wherein the at least one first interengagement feature is configured for releasable interengagement in the first direction with the at least one second interengagement feature whereby the fin of the second interengagement feature is received within the slot of the first interengagement feature and the flange-like portion of the first interengagement feature is received in the channel-like slot of the second interengagement feature to resist outward bowing of the first and second sidewalls of the frame and thereby maintain engagement between the at least one first snap coupling element and the at least one second snap coupling element.

11. The case of claim 10, wherein the at least one first and second snap coupling elements restrict movement between the base and the frame in the first direction.

12. The case of claim 10, wherein the at least one first interengagement feature is provided on the at least one attachment flange and the at least one second interengagement feature is provided on at least one of the first and second sidewalls.

13. The case of claim 12, wherein the releasable interengagement between the first and second interengagement feature restricts movement of at least one of the first and second sidewalls in a second direction, the second direction generally transverse to the first direction.

14. The case of claim 10, further comprising one or more release access recesses formed along an interface defined between the base and the fame in an assembled state, and wherein the at least one first snap coupling element comprises a gradual reduction or tapered portion that is positioned proximal the one or more release access recesses.

15. The case of claim 1, wherein the flange-like portion and the channel or slot of the first interengaging feature and the fin and the channel-like slot of the second interengaging feature extend in the first direction.

16. A case for an electronic device comprising:
    a base comprising a back panel and an attachment flange projecting from the back panel in a forward direction generally perpendicular to the back panel, the attachment flange extending about the periphery of the back panel along at least first and second sides thereof, the attachment flange comprising first snap coupling elements and first interengagement features on each of the first and second sides; and a frame comprising a top, a bottom, and first and second sidewalls, with an open front and an open back, and a lip projecting inwardly around at least a portion of the open front, the frame further comprising second snap coupling elements and second interengagement features on each of the first and second sidewalls;

wherein the base and frame releasably couple to one another by sliding the attachment flange of the base into the frame through the open back of the frame in the forward direction, thereby engaging the first snap coupling elements with the second snap coupling elements to resist detachment of the frame from the base, and engaging the first interengagement features with the second interengagement features to resist bowing of the first and second sidewalls of the frame in an outward direction transverse to the forward direction and thereby maintain engagement of the first snap coupling elements with the second snap coupling elements.

17. The case of claim 16, wherein the first interengagement features comprise channels formed on the first and second sides of the attachment flange of the base, and wherein the second interengagement features comprise fins extending generally parallel to the first and second sidewalls of the frame, said fins configured to be received within said channels as the attachment flange of the base slides into the frame.

* * * * *